United States Patent
Erhart et al.

(10) Patent No.: US 10,319,376 B2
(45) Date of Patent: Jun. 11, 2019

(54) GEO-SPATIAL EVENT PROCESSING

(71) Applicant: Avaya Inc., Santa Clara, CA (US)

(72) Inventors: George William Erhart, Loveland, CO (US); Valentine C. Matula, Granville, OH (US); David Joseph Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 37 days.

(21) Appl. No.: 14/690,649

(22) Filed: Apr. 20, 2015

(65) Prior Publication Data

US 2015/0364134 A1 Dec. 17, 2015

Related U.S. Application Data

(63) Continuation-in-part of application No. 12/561,459, filed on Sep. 17, 2009, now abandoned.

(51) Int. Cl.
 *G10L 15/19* (2013.01)
 *G06F 17/27* (2006.01)
 *G10L 15/22* (2006.01)

(52) U.S. Cl.
 CPC .......... *G10L 15/19* (2013.01); *G06F 17/2785* (2013.01); *G10L 15/22* (2013.01); *G10L 2015/228* (2013.01)

(58) Field of Classification Search
 USPC ......................... 704/246, 247, 251, 252, 257
 See application file for complete search history.

(56) References Cited

U.S. PATENT DOCUMENTS

| | | | |
|---|---|---|---|
| 5,873,095 A | 2/1999 | Gore | |
| 6,510,380 B1 | 1/2003 | Curatolo et al. | |
| 6,736,322 B2 | 5/2004 | Gobburu et al. | |
| 7,283,846 B2 | 10/2007 | Spriestersbach et al. | |
| 7,328,155 B2 * | 2/2008 | Endo | G10L 15/08 704/251 |
| 7,486,943 B2 | 2/2009 | Choti et al. | |
| 7,630,900 B1 * | 12/2009 | Strom | 704/270 |
| 7,725,480 B2 * | 5/2010 | Bassett | G06Q 10/109 707/758 |
| 7,737,861 B2 | 6/2010 | Lea et al. | |
| 7,847,686 B1 | 12/2010 | Atkins et al. | |
| 7,864,047 B2 | 1/2011 | Aninye et al. | |

(Continued)

OTHER PUBLICATIONS

Official Action for U.S. Appl. No. 12/713,512, dated Jun. 25, 2015 13 pages.

(Continued)

*Primary Examiner* — Leonard Saint Cyr
(74) *Attorney, Agent, or Firm* — Sheridan Ross P.C.

(57) ABSTRACT

A geo-spatial grammar comprises rules, syntax, and other means by which a data input is determined to have a meaning associated with a particular event. The event may then be provided to an application, such as a calendaring or messaging application. As a benefit, an input, such as a user speaking the phrase, "I'll be there in an hour," may be interpreted, via the geo-spatial grammar, as an event (e.g., "I'll be in the office," "I'll join you for dinner," "I'll be home," etc.). An application may then perform an action based upon the event (e.g., reschedule the meeting that starts in five minutes, present directions to the restaurant on the user's car's navigation system, notify the user's spouse, etc.).

20 Claims, 8 Drawing Sheets

(56) References Cited

U.S. PATENT DOCUMENTS

| | | | |
|---|---|---|---|
| 7,881,945 B2* | 2/2011 | Schmitt | G06Q 10/10 705/1.1 |
| 7,929,954 B2 | 4/2011 | Choti et al. | |
| 8,103,250 B2 | 1/2012 | Sullivan et al. | |
| 8,452,524 B2 | 5/2013 | Groitzsch et al. | |
| 2002/0052786 A1 | 5/2002 | Kim et al. | |
| 2002/0196280 A1* | 12/2002 | Bassett | G06Q 10/109 715/751 |
| 2003/0018613 A1 | 1/2003 | Oytac | |
| 2003/0130893 A1 | 7/2003 | Farmer | |
| 2004/0019542 A1 | 1/2004 | Fuchs et al. | |
| 2004/0078209 A1 | 4/2004 | Thomson | |
| 2004/0082296 A1 | 4/2004 | Twitchell | |
| 2004/0111279 A1 | 6/2004 | Schoen et al. | |
| 2004/0260623 A1 | 12/2004 | Borenstein et al. | |
| 2005/0038876 A1 | 2/2005 | Chaudhuri | |
| 2005/0080632 A1* | 4/2005 | Endo | G10L 15/08 704/277 |
| 2005/0168340 A1 | 8/2005 | Mosher et al. | |
| 2005/0234771 A1 | 10/2005 | Register et al. | |
| 2006/0069577 A1* | 3/2006 | Schmitt | G06Q 30/016 705/304 |
| 2007/0027806 A1 | 2/2007 | Sands et al. | |
| 2007/0136068 A1 | 6/2007 | Horvitz | |
| 2007/0136222 A1 | 6/2007 | Horvitz | |
| 2007/0174390 A1 | 7/2007 | Silvain et al. | |
| 2007/0203765 A1 | 8/2007 | Schoen et al. | |
| 2007/0220063 A1* | 9/2007 | O'Farrell | G06F 17/277 |
| 2007/0264974 A1 | 11/2007 | Frank et al. | |
| 2008/0162471 A1* | 7/2008 | Bernard | G06F 17/30017 |
| 2008/0162513 A1 | 7/2008 | Biard et al. | |
| 2008/0167937 A1 | 7/2008 | Coughlin et al. | |
| 2009/0043627 A1* | 2/2009 | Vaidya | G06Q 10/0637 705/7.36 |
| 2009/0098888 A1 | 4/2009 | Yoon | |
| 2009/0165092 A1 | 6/2009 | McNamara | |
| 2009/0219169 A1 | 9/2009 | Herwats | |
| 2009/0228281 A1* | 9/2009 | Singleton | G10L 15/08 704/275 |
| 2009/0233588 A1 | 9/2009 | Li | |
| 2009/0239667 A1 | 9/2009 | Rowe et al. | |
| 2009/0271270 A1 | 10/2009 | Regmi et al. | |
| 2009/0271289 A1 | 10/2009 | Klinger et al. | |
| 2009/0298511 A1* | 12/2009 | Paulson | H04M 19/04 455/456.1 |
| 2009/0300525 A1* | 12/2009 | Jolliff | H04M 1/72544 715/764 |
| 2010/0049580 A1 | 2/2010 | Bantz et al. | |
| 2010/0076777 A1 | 3/2010 | Paretti et al. | |
| 2010/0077484 A1 | 3/2010 | Paretti et al. | |
| 2010/0121567 A1 | 5/2010 | Mendelson | |
| 2010/0131343 A1 | 5/2010 | Hamilton, II et al. | |
| 2010/0153171 A1 | 6/2010 | Erhart et al. | |
| 2010/0235218 A1 | 9/2010 | Erhart et al. | |
| 2011/0066423 A1 | 3/2011 | Erhart et al. | |
| 2011/0196714 A1 | 8/2011 | Erhart et al. | |
| 2011/0196724 A1 | 8/2011 | Fenton et al. | |
| 2011/0215902 A1 | 9/2011 | Brown, III et al. | |
| 2011/0252456 A1 | 10/2011 | Hatakeyama | |
| 2012/0058784 A1 | 3/2012 | Niemenmaa et al. | |
| 2015/0199651 A1* | 7/2015 | Raman | G06Q 10/1095 705/7.19 |

OTHER PUBLICATIONS

Official Action for U.S. Appl. No. 12/702,764, dated Sep. 3, 2015 27 pages.
U.S. Appl. No. 11/499,484, filed Aug. 4, 2006, Daily.
Liu et al., "Location awareness through trajectory prediction," ScienceDirect.com, Computers, Environment and Urban Systems, Location Based Services, vol. 30(6), May 2, 2006, pp. 741-756.
Official Action for U.S. Appl. No. 12/713,512, dated Dec. 27, 2011, 16 pages.
Final Action for U.S. Appl. No. 12/713,512, dated Jun. 18, 2012, 23 pages.
Official Action for U.S. Appl. No. 12/713,512, dated Mar. 26, 2014, 24 pages.
Official Action for U.S. Appl. No. 12/713,512, dated Sep. 26, 2014, 12 pages.
Official Action for U.S. Appl. No. 12/784,369, dated Oct. 4, 2012, 11 pages.
Final Action for U.S. Appl. No. 12/784,369, dated Mar. 14, 2013, 14 pages.
Official Action for U.S. Appl. No. 12/784,369, dated Aug. 8, 2013, 17 pages.
Restriction Requirement for U.S. Appl. No. 12/702,764, dated Jul. 12, 2012, 6 pages.
Official Action for U.S. Appl. No. 12/702,764, dated Aug. 9, 2012, 13 pages.
Final Action for U.S. Appl. No. 12/702,764, dated Jan. 4, 2013, 18 pages.
Official Action for U.S. Appl. No. 12/702,764, dated Mar. 25, 2014, 16 pages.
Official Action for U.S. Appl. No. 12/702,764, dated Aug. 25, 2014, 25 pages.
Official Action for U.S. Appl. No. 12/702,764, dated Feb. 11, 2015 22 pages.
Official Action for U.S. Appl. No. 12/702,764, dated Apr. 27, 2015 23 pages.
Official Action for U.S. Appl. No. 12/561,459, dated Feb. 3, 2012.
Final Action for U.S. Appl. No. 12/561,459, dated Nov. 2, 2012, 24 pages.
Official Action for U.S. Appl. No. 12/561,459, dated Jun. 18, 2014, 34 pages.
Official Action for U.S. Appl. No. 12/561,459, dated Nov. 14, 2014, 34 pages.
Kurkovsky et al., "Using ubiquitous computing in interactive mobile marketing," Pers Ubiquit Comput., 2006, vol. 10, pp. 227-240.
Lee et al., "Connected Consumption: The Hidden networks of Consumption," 2009 6th IEEE Consumer Communications and Networking Conference, Jan. 10-13, 2009, Las Vegas, NV, pp. 1-5.
Official Action (with English translation) for German Patent Application No. 102010013292.6, dated Jun. 8, 2016 13 pages.
Official Action for German Patent Application No. 102010013292.6, dated Sep. 27, 2016 16 pages.
Official Action for United Kingdom Patent Application No. GB1005139.9, dated Feb. 3, 2016 5 pages.
Official Action for United Kingdom Patent Application No. GB1005139.9, dated May 23, 2016 6 pages.

* cited by examiner

| | | | | |
|---|---|---|---|---|
| Monday | 12:00PM – 1:00PM | Company cafeteria | Lunch |
| Tuesday | 11:58AM-12:59PM | Company cafeteria | Lunch |
| Wednesday | 11:55AM-1:10PM | Company cafeteria | Lunch |
| Thursday | 12:05PM-1:15PM | Company cafeteria | Lunch |
| Friday | 12:02PM-12:55PM | Company cafeteria | Lunch |
| Saturday | All day | Home | Home |
| Sunday | 7:30PM – 9:00PM | "Joe's Bistro" | Dinner |

*FIG. 5*

| | | | |
|---|---|---|---|
| Is the day a weekday? | | | |
| Yes: | Is the time 12:00PM to 1:00PM ±10 minutes? | | |
| | Yes: | Lunch in Company cafeteria – 92% | |
| | | Lunch at Corner Sandwich – 5% | |
| | | Lunch at desk – 2% | |
| | | Lunch at "unknown" – 1% | |
| | | "unknown" at "unknown" – 1% | |
| | No: | (Not) Lunch, (Not) Company cafeteria - 99% | |
| | | Working at desk – 89% | |
| No: | (Not) at work – 99% | | |
| | Is the day a Sunday? | | |
| | Yes: | Is the time 7:30PM – 9:00PM | |
| | | Yes: | "Joe's Bistro" - 63% |
| | | No: | Home – 21% |
| | No: | Home – 83% | |

GEO-SPATIAL EVENT PROCESSING

CROSS-REFERENCE TO RELATED APPLICATIONS

The present application is a continuation-in-part of and claims the benefit of patent application Ser. No. 12/561,459, filed on Sep. 17, 2009, and is incorporated herein by reference in its entirety.

FIELD OF THE DISCLOSURE

The present disclosure relates to location-aware applications.

BACKGROUND

There is a long history of using geographic location systems in cooperation with applications that provide a user benefit. An early example of this is the LORAN system developed by the British during World War 2 for military purposes. LORAN uses multiple low-frequency radio transmitters to locate the position of an object and determine its speed. The United States Navy created a sequence of position locating systems during the 1960s and 1970s including Transit, Timation, and the Omega navigation system. A more recent and better known example of such a system is the NAVSTAR GPS, usually referred to as the "GPS" system, that uses a constellation of earth orbit satellites and its microwave signals to determine the current position, time, and velocity of an object. While each of these successive systems improved accuracy, each was limited to producing some combination of position, time, and velocity.

Over time, improvements to the basic idea of GPS developed. One such example is the concept of geo-fences. Geo-fences are virtual boundaries overlaid on a geographical area. Geo-fences are one type of a location-based service that detects when an object crosses (enters or exits) one or more of these virtual boundaries. These geo-fences can be used for tracking children, livestock, and wildlife crossing certain virtual boundaries. Furthermore, geo-fences have now been extended to large retail environments to track customer flows and the like.

In addition to the position, navigation systems, and functionality provided by the prior art, other technologies have developed, such as speech-recognition systems.

Speech recognition is the ability of a machine or program to identify words and phrases in spoken language and convert them to a machine-readable format. Applications of speech recognition include call routing, speech-to-text, voice dialing, and voice search.

Figure 1:
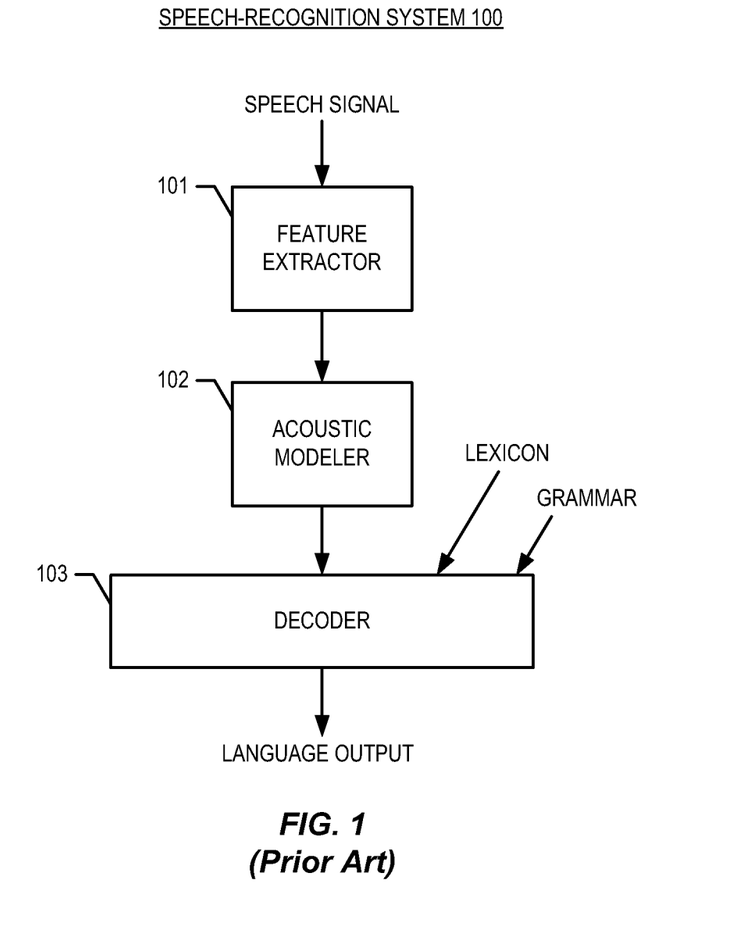
FIG. 1 depicts the salient elements of a speech-recognition system, in accordance with the prior art.

FIG. 1 depicts the salient elements of speech-recognition system 100, in accordance with the prior art. As shown in FIG. 1, speech-recognition system 100 comprises feature extractor 101, acoustic modeler 102, and decoder 103, interconnected as shown.

Feature extractor 101 comprises software, hardware, or both, that is capable of receiving an input electromagnetic signal that represents speech (e.g., a signal obtained from a user speaking into a microphone, etc.) and of extracting features (e.g., phonemes, etc.) from the input signal (e.g., via signal processing techniques, etc.).

Acoustic modeler 102 comprises software, hardware, or both, that is capable of receiving features generated by feature extractor 101 and of applying an acoustic model (e.g., a Gaussian statistical model, a Markov chain-based model, etc.) to the features.

Decoder 103 comprises software, hardware, or both, that is capable of receiving output from acoustic modeler 102, and of generating output in a particular language based on the output from acoustic modeler 102, a lexicon for the language, and a grammar for the language. For example, the lexicon might be a subset of the English language (e.g., a set of relevant English words for a particular domain, etc.), and the grammar might be a context-free grammar comprising the following rules:
SENTENCE→NOUN-PHRASE VERB-PHRASE
NOUN-PHRASE→ARTICLE NOUN|ARTICLE ADJECTIVE NOUN|NOUN
VERB-PHRASE→VERB ADVERB|VERB Alternatively, the grammar might be a statistical grammar that predicts the probability with which a word or phrase is followed by another word or phrase (e.g., the probability that the phrase "Voice over" is followed by the phrase "IP" might be 0.7, etc.)

SUMMARY

It is with respect to the above issues and other problems that the embodiments presented herein were contemplated.

Embodiments of the present disclosure enable a speech-recognition system to perform functions related to the geo-locations of wireless telecommunications terminal users via the use of a geo-spatial grammar—either in addition to, or instead of, its typical speech-recognition functions. In particular, in accordance with an illustrative embodiment, a geo-spatial grammar is employed that comprises a plurality of rules concerning the geo-locations of users, and a speech-recognition system uses the geo-spatial grammar to generate actions in a location-aware application, as well as to estimate the geo-locations of wireless telecommunications terminal users themselves.

For example, in accordance with an illustrative embodiment, a geo-spatial grammar might comprise a rule that indicates that a user typically eats lunch between noon and 1:00 PM, in which case a user input (e.g., text input or voice input into a speech-recognition system) using this grammar might generate an action in a location-aware application that notifies the user when he or she is within two miles of a pizza parlor during the 12:00-1:00 PM hour. As another example, a geo-spatial grammar might comprise one or more rules regarding the movement of a user, in which case a speech-recognition system using this grammar might provide an estimate of the geo-location of a user when that user's wireless telecommunications terminal is unable to receive sufficient Global Positioning System (GPS) signals (e.g., in an urban canyon, etc.).

Embodiments of the present disclosure thus provide an improved speech-recognition system that is capable of estimating the geo-location of users and of generating pertinent actions in a location-aware application, in addition to its usual function of identifying words and phrases in spoken language. Such a speech-recognition system is advantageous in a variety of location-aware applications, such as interactive voice response (IVR) systems, voice-activated navigation systems, voice search, voice dialing, and so forth.

The illustrative embodiment comprises: a feature extractor for extracting features from an electromagnetic signal that represents speech; and a decoder for generating output in a language based on: (i) output from the feature extractor, (ii) the contents of a lexicon for the language, and (iii) a first grammar that is for the language; and wherein the improvement comprises, in part: the decoder is also for generating actions for a location-aware application based on a second grammar; and wherein the second grammar comprises one or more rules concerning the geo-locations of one or more users.

Disclosed herein includes means of translating geographical information into actionable events for use by one or more applications. As a benefit, the embodiments disclosed herein go beyond position, speed, and time associated with two objects of a system. Destination prediction, multi-party interactions, repetitious behaviors, user motivations and other information that can be identified and shared with, and/or modified by, close ties between the geographical information and the applications.

In one embodiment, a system is provided comprising a geo-spatial recognition system core. The core receives current position and updates to position, for one or more objects, as they become available. The core may also receive input in the form of geo-spatial grammars. In one embodiment, geo-spatial grammars are the syntax and/or rules for use of a programming language that take advantage of matches with positional information of the one or more objects. The core may also make use of inputs from an application, such as a scheduling tool where the user of the tool may have set aside a time for a stated purpose, which could be correlated to the inputs of grammar and location information. The core may also output events and notifications to applications, such as to take advantage of the combination of the positional information and the grammar inputs.

In one embodiment, the geo-spatial recognition system core loads a grammar definition. The system may receive initial and/or periodic positional updates. Location, speed, direction, acceleration, date, time, etc. may then be tracked and attempts to match a variety of status indicators to elements of the grammar. This could also optionally include cross-correlation with a calendar entry and/or a past travel path, such as to attempt to determine if the object/person has the same motivation as a previous similar route or trip. If a match between the grammar and an object's positioning information is found, an event/tag may be created to trigger an external system's actions. In another embodiment, multiple grammars can be loaded to the core and may be active in serial or in parallel with each other.

The core geo-spatial grammar may have specific capabilities. For example, the geo-spatial grammar may have primitives for defining specific/absolute locations. An ability to include definitions provided by others may be incorporated, such as, a vendor providing their store location, for example. This may be organized as a hierarchical structure with locations containing sub-locations, such as the position of an item for sale within a retail store. A hierarchical structure may utilize a physical container in two or three dimensions, such as a geo-fenced area as a location. Other organizational structures may use an individual point (e.g., latitude and longitude), points, or other identifiers. The concept of proximity to a location may be an external parameter. There may be primitives for direction, speed, time, day, date, year, acceleration, etc.

Examples of implementations of certain embodiments disclosed herein include, geo-fencing applications where notification is made (e.g., via event/tag) based on the proximity of a tracked object/person to a defined location in the grammar. In another example, an application automatically changes the handling of communication requests based on the speed of the receiver of the communication. In another example, more complicated descriptions are provided that include sequences or parallel groupings of location items.

The next level of complexity adds the ability to construct descriptions that include sequences or parallel groupings of location items. Specifically, the geo-spatial core has the ability to match on a simple single grammar or can match on several grammars running in parallel or series, which may be referred to as, "grammar compounding." This grammar compounding allows multiple location attributes to be considered (matched) prior to an event/tag being created. These compound grammars can provide significant advantages beyond the prior art. It would, for example, allow matching on a person who has gone to work, left work, gone to the store, then left the store before triggering the event/tag that triggers notification to a spouse that, "I am on my way home from the store." Embodiments disclosed herein, provide for specifying a grammar for activities/notifications triggered by geo-spatial status combined with a history of one or more events/entities.

This geo-spatial system can also deal with multiple moving objects or people. The geo-spatial grammars may match on certain combinations of moving objects or people. Applications implementing embodiments disclosed herein may include new capabilities, such as recognition that several objects/people are in proximity without otherwise being aware of it. For example, a person could be traveling and during a layover need to accomplish several tasks. The traveler may need to eat, check on the status/gate for the next flight, etc. If that traveler knows the location of a restaurant in close proximity to a monitor displaying flight information, a significant improvement in the art and time savings may be realized by directing the traveler to that particular restaurant. There may be only one combination of monitors and restaurants that will fit within the traveler's time constraints, or alternatively, if the layover is lengthy, several combinations may work.

In one embodiment, a system is disclosed, comprising: a processor; a communication interface configured to facilitate electronic communication with the processor; the processor being configured to receive a geo-spatial grammar and a geo-spatial datum; selecting an event from the combination of the geo-spatial grammar and the geo-spatial datum; and outputting the event.

In another embodiment, a method is disclosed, comprising: accessing a geo-spatial grammar, a geo-spatial datum, and a user input; selecting an event from the combination of the geo-spatial grammar and the geo-spatial datum; and outputting the event.

In another embodiment, a non-transitory computer-readable medium is disclosed with instructions thereon that when read by a computer cause the computer to perform: accessing a geo-spatial grammar, a geo-spatial datum, and a user input; selecting an event from the combination of the geo-spatial grammar and the geo-spatial datum; and outputting the event.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Any reference in the description comprising an element number, without a subelement identifier when a subelement identifiers exist in the figures, when used in the plural is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 2:
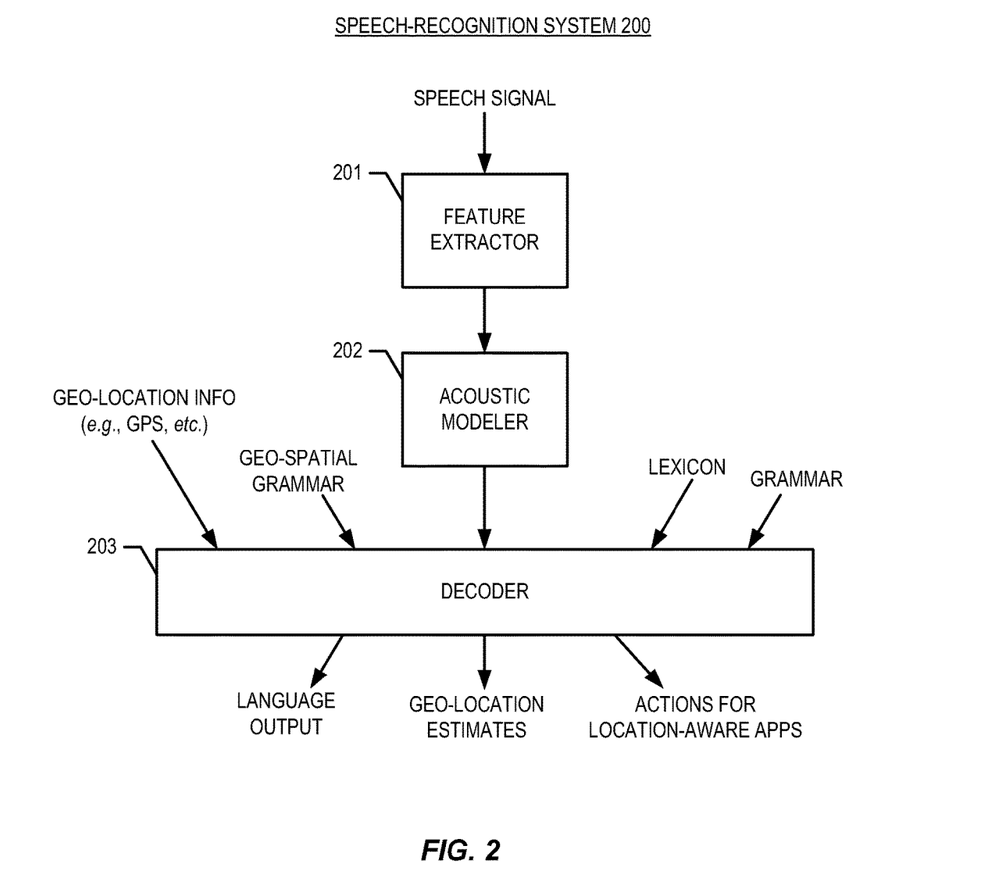
FIG. 2 depicts the salient elements of a speech-recognition system, in accordance with embodiments of the present disclosure.

FIG. 2 depicts the salient elements of speech-recognition system 200, in accordance with the illustrative embodiment of the present disclosure. As shown in FIG. 2, speech-recognition system 200 comprises feature extractor 201, acoustic modeler 202, and decoder 203, interconnected as shown.

Feature extractor 201 comprises software, hardware, or both, that is capable of receiving an input electromagnetic signal that represents speech (e.g., a signal obtained from a user speaking into a microphone, etc.) and of extracting features (e.g., phonemes, etc.) from the input signal (e.g., via signal processing techniques, etc.).

Acoustic modeler 202 comprises software, hardware, or both, that is capable of receiving features generated by feature extractor 201 and of applying an acoustic model (e.g., a Gaussian statistical model, a Markov chain-based model, etc.) to the features.

Decoder 203 comprises software, hardware, or both, that is capable of:

(i) receiving output from acoustic modeler 202;

(ii) generating output in a particular language (e.g., English, etc.) based on:
  output from acoustic modeler 202,
  a lexicon for the language, and
  a grammar for the language;

(iii) receiving information regarding the geo-location of one or more telecommunications terminal users (e.g., current GPS geo-location estimates, prior geo-location estimates, historical geo-location information, etc.);

(iv) receiving information regarding the geo-location of one or more telecommunications terminal users (e.g., current GPS geo-location estimates, prior geo-location estimates, historical geo-location information, etc.);

(v) matching and firing rules in a geo-spatial grammar, based on:
  the received geo-location information,
  the calendrical time, and
  the contents of one or more calendars;

(vi) estimating the current geo-location of one or more users in accordance with fired rules of the geo-spatial grammar; and (vii) generating actions in one or more location-aware applications in accordance with fired rules of the geo-spatial grammar.

For example, a geo-spatial grammar might have one or more of the following rules for estimating current or future user geo-locations:

a particular user is typically in the corporate cafeteria between noon and 1:00 PM on weekdays;

a particular user takes a particular car route home from work;

vehicles at a particular traffic intersection typically make a right turn;

if a user's current geo-location is unknown (e.g., the user's terminal is not receiving a sufficient number of GPS satellite signals, etc.), consult one or more calendars for an entry that might indicate a likely geo-location for that user.

Similarly, a geo-spatial grammar might have one or more of the following rules for generating actions in location-aware applications:

if a user is within 100 yards of a friend, generate an alert to notify the user;

if a user is in a schoolyard, enable a website filter on the user's terminal;

if a user says the word "Starbucks," display a map that shows all nearby Starbucks locations;

if a user is inside a book store, automatically launch the terminal's browser and go to the Amazon.com website (presumably so that the user can easily perform a price check on an item).

In accordance with the illustrative embodiment, input to the geo-spatial grammar is represented as a vector comprising a plurality of data related to geo-location, such as time, latitude, longitude, altitude, direction, speed, rate of change in altitude, ambient temperature, rate of change in temperature, ambient light level, ambient noise level, etc. As will be appreciated by those skilled in the art, in some other embodiments the vector might comprise other data instead of, or in addition to, those of the illustrative embodiment, and it will be clear to those skilled in the art, after reading this disclosure, how to make and use such embodiments.

As will further be appreciated by those skilled in the art, in some embodiments disclosed herein, the algorithms employed by decoder 203 to generate output in a particular language (i.e., tasks (i) and (ii) above) might be different than those employed for the processing related to the geo-spatial grammar (i.e., tasks (iii) through (vii) above), while in some other embodiments, some or all of these algorithms might be employed by decoder 203 for both purposes. As will yet further be appreciated by those skilled in the art, in some embodiments disclosed herein, the grammar for the language and the geo-spatial grammar might be different types of grammars (e.g., a statistical grammar for the language and a context-free geo-spatial grammar, etc.), while in some other embodiments, the same type of grammar might be employed for both purposes.

Figure 3:
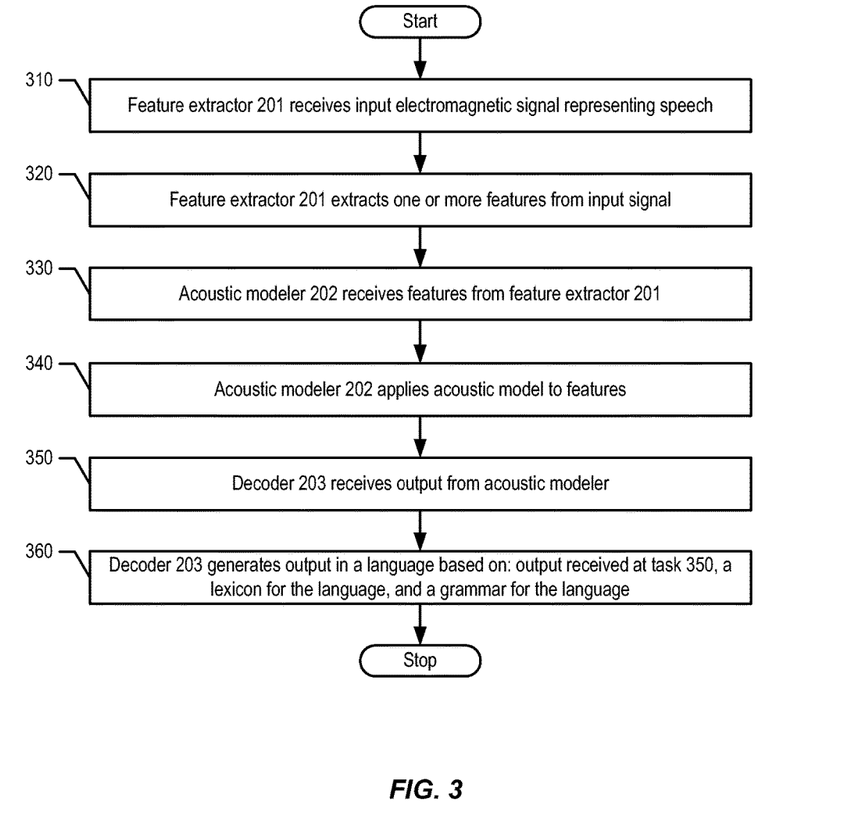
FIG. 3 depicts a flowchart of the salient tasks of a first method performed by a speech-recognition system, in accordance with embodiments of the present disclosure.

FIG. 3 depicts a flowchart of the salient tasks of a first method performed by speech-recognition system 200, in accordance with certain embodiments disclosed herein. It will be clear to those skilled in the art, after reading this disclosure, which tasks depicted in FIG. 3 can be performed simultaneously or in a different order than that depicted.

At task 310, feature extractor 201 receives an input electromagnetic signal representing speech, in well-known fashion.

At task 320, feature extractor 201 extracts one or more features (e.g., phonemes, etc.) from the input signal received at task 310, in well-known fashion.

At task 330, acoustic modeler 202 receives the features extracted at task 320 from feature extractor 201, in well-known fashion.

At task 340, acoustic modeler 202 applies an acoustic model (e.g., a Gaussian statistical model, a Markov chain-based model, etc.) to the features received at task 330, in well-known fashion.

At task 350, decoder 203 receives output from acoustic modeler 202, in well-known fashion.

At task 360, decoder 203 generates output in a language based on the output received at task 350, a lexicon for the language, and a grammar for the language, in well-known fashion.

After task 360, the method of FIG. 3 terminates.

Figure 4:
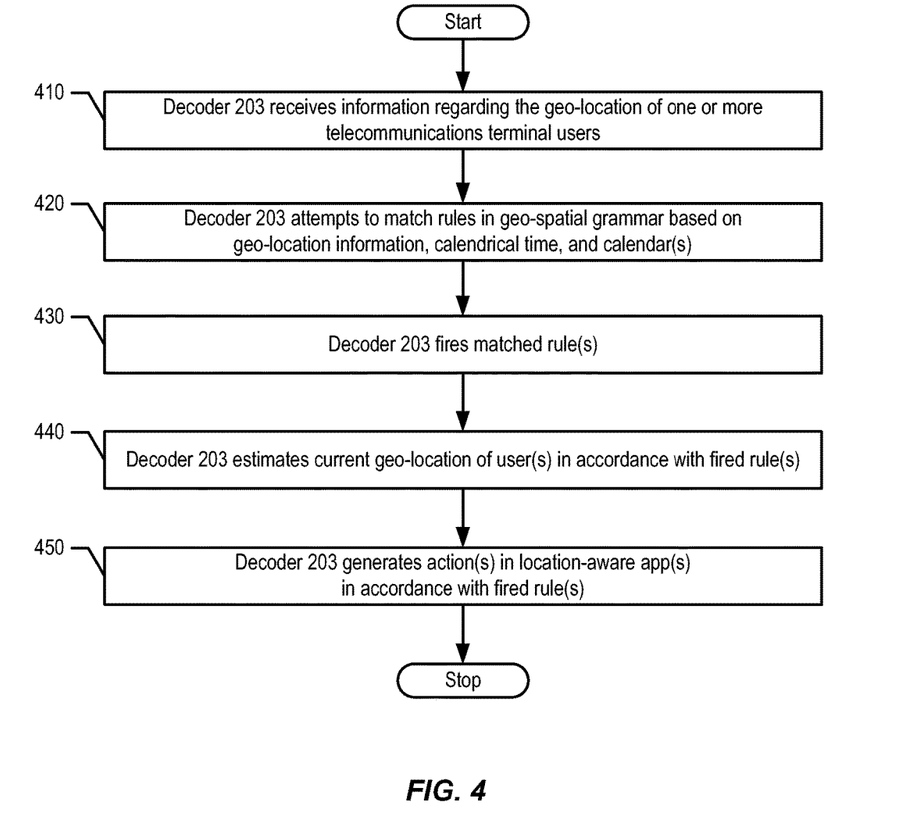
FIG. 4 depicts a flowchart of the salient tasks of a second method performed by a speech-recognition system, in accordance with embodiments of the present disclosure.

FIG. 4 depicts a flowchart of the salient tasks of a second method performed by speech-recognition system 200, in accordance with certain embodiment disclosed herein. It will be clear to those skilled in the art, after reading this disclosure, which tasks depicted in FIG. 4 can be performed simultaneously or in a different order than that depicted.

At task 410, decoder 203 receives information regarding the geo-location of one or more telecommunications terminal users (e.g., current GPS geo-location estimates, prior geo-location estimates, historical geo-location information, etc.).

At task 420, decoder 203 attempts to match rules in a geo-spatial grammar based on the geo-location information received at task 410, the calendrical time, and the contents of one or more calendars.

At task 430, decoder 203 fires one or more matched rules, in well-known fashion.

At task 440, decoder 203 estimates the current geo-location of one or more users, in accordance with the rules fired at task 430.

At task 450, decoder 203 generates one or more actions in one or more location-aware applications, in accordance with the rules fired at task 430.

After task 450, the method of FIG. 4 terminates.

Figure 5:
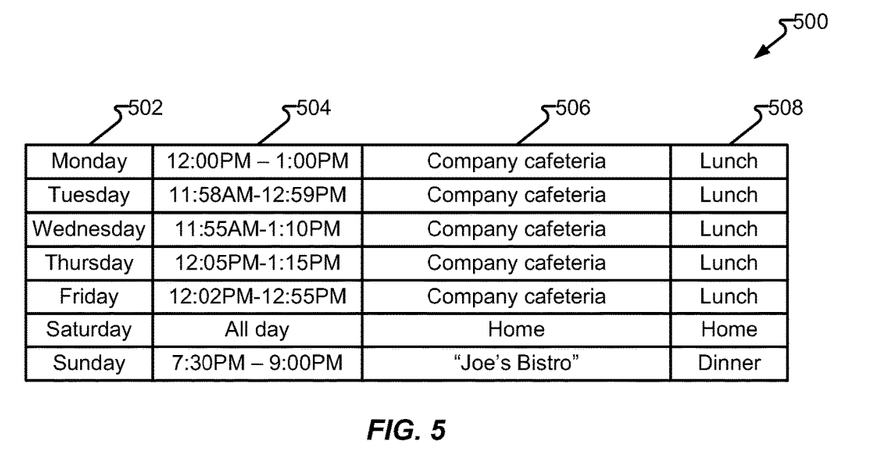
FIG. 5 depicts a table, in accordance with embodiments of the present disclosure.

FIG. 5 depicts table 500 in accordance with embodiments of the disclosure. In one embodiment, table 500 comprises records having first attribute 502, second attribute 504, specific datum 506, and summary datum 508. Records of table 500 may comprise entries associated with the geo-spatial actions of a user. As can be appreciated by those of ordinary skill in the art, the specific number and usage of elements comprising any one or more records of table 500 may be determined as a matter of design choice. For example, if location were more determinative than time, more informational elements related towards location may be implemented as compared to temporal related data elements.

In one embodiment, first attribute 502 comprises a day of the week for an observed geo-spatial act of a user, second attribute 504 comprises a start and stop time for the observed geo-spatial act of the user, specific datum 506 comprises a location name for a geo-spatial act, and summary datum 508 comprises a summary and/or category of the geo-spatial act. As can be appreciated, and one user may create many records, even in a period as short as a single day. Entries into table 500 may be provided manually (e.g., entry by the user), external system (e.g., security system), or by a device carried by the user, such as a smart phone or other device operable to detect at least time and location of the device and associated user. The device may be further operable to capture other geo-spatial data, including but not limited to, time, date, day, day of the week, day of the month, day of the year, holiday, duration, latitude, longitude, altitude, direction, speed, rate of change in altitude, ambient temperature, rate of change in temperature, ambient light level, ambient noise level, etc.

Specific datum 506 and summary datum 508 may be determined as a matter of design choice and may be omitted whereby other elements of table 500 are utilized to determine a geo-spatial grammar. In one embodiment, specific datum 506 is determined based on usability as a geo-spatial grammar or an element thereof. For example, if first attribute 502 were related to motion (e.g., speed, direction, etc.), but the user was often in motion (e.g., delivery driver, emergency responder, etc.), a specific speed or direction may be of little use and therefore, omitted. In another embodiment, the granularity may be modified, such as to simply, "traveling," "working," "responding," etc.

Figure 6:
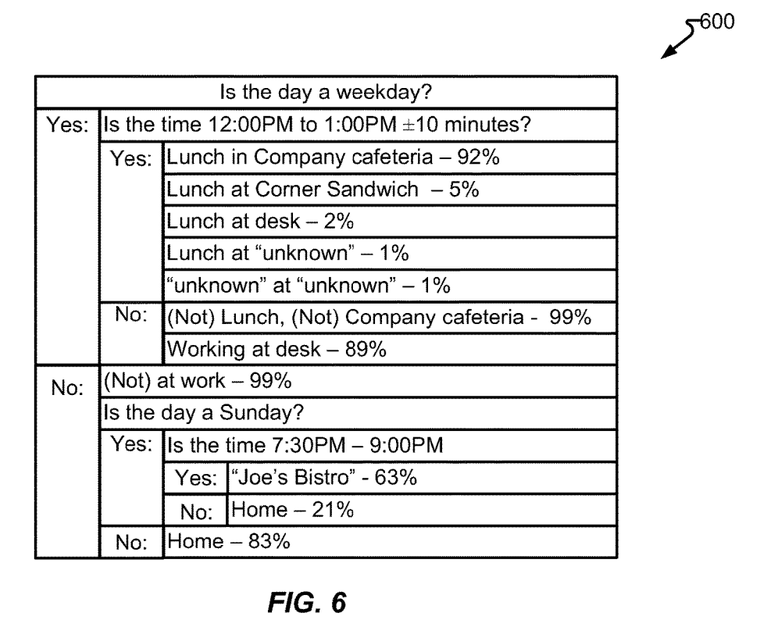
FIG. 6 depicts a geo-spatial grammar, in accordance with embodiments of the disclosure.

FIG. 6 depicts geo-spatial grammar 600 in accordance with embodiments of the disclosure. In one embodiment, geo-spatial grammar 600 is derived from the geo-spatial actions of a user, such as described more fully with respect to FIG. 5. Geo-spatial grammar 600 provides rules, syntax, and/or other context for a particular geo-spatial datum. The context may then be associated with an event and/or meaning associated with a geo-spatial activity for the user. Geo-spatial grammar 600 may be more readily understood by the usage thereof, in particular that which is more fully described with respect to FIGS. 7A-7D. However, geo-spatial grammar 600, without regard to the usage thereof, provides a translation of an input into an output (e.g., an event, message, etc.) based upon a particular geo-spatial grammar.

In one embodiment, geo-spatial grammar 600 is the only geo-spatial grammar and contains all entries, which may be further limited to a particular user. In another embodiment, geo-spatial grammar 600 is one of a plurality of geo-spatial grammars. For example, a user may be determined to be commuting to their place of employment and one, or a subset less than all, of the plurality of geo-spatial grammars may be selected. Optionally, a number of geo-spatial grammars not related to commuting may be excluded from further use, until such time as one or more of the executed geo-spatial grammars is determined to be relevant. For example, geo-spatial grammars related to work, approaching work, driving, commuting, preparing for work, etc. may be loaded for ready access by a system or processor and geo-spatial grammars determined not to be relevant (e.g., weekend, home, traveling to a recreational site, etc.) may be omitted from further consideration, not loaded, unloaded, etc. In such an embodiment, the message, "I'll be an hour late," may translate into an event (e.g., notify a restaurant of the change of plans, reschedule the 9:00 meeting, send a message to my spouse that I'll be home late, automatically decline any meeting requests for the next two hours, forward my calls to my co-worker, etc.) that is associated with the particular geo-spatial grammar in use.

FIGS. 7A-7D each depicts an operation performed by geo-spatial grammar 600. In the embodiments depicted by FIGS. 7A-7D, geo-spatial datum 702, 710, 718, 726; the analysis thereof utilizing geo-spatial grammar 600; and the output corresponding event 704, 706, 708, 712, 714, 716, 720, 722, 724, 728, 730, 732 is provided. It should be appreciated that geo-spatial grammar 600 may receive geo-spatial datum 702, 710, 718, 726; retrieve geo-spatial datum 702, 710, 718, 726; or otherwise be utilized by a process or processor having access to geo-spatial grammar 600 and geo-spatial datum 702, 710, 718, 726.

In one embodiment, geo-spatial grammar 600 provides a meaning to an event. Geo-spatial grammar 600 may know or otherwise have access to other datum. For example, a time data input may be considered with a known position or location datum. Conversely, a location datum may be input and, based upon geo-spatial grammar 600 having access to a time datum, select an input. While FIGS. 7A-7D may indicate a single input producing one of three outputs, it should be appreciated that any number of inputs may be received and/or accessed. For example, upon receiving a message input, geo-spatial grammar 600 may also receive a location or other datum or data and, based on a plurality of the received or accessed datum, select an output. In another embodiment, the output may be selected from one or more previously defined events or dynamically generated in accord with a rule. For example, a user driving for one purpose may provide positional inputs and geo-spatial grammar 600, with access to a personal "to-do" list, which determines that, even though the user has one purpose, another purpose may be accomplished. In a further example, the user's dry cleaning is ready and the user will be near the location to pick up the dry cleaning, a dynamic message may be created to alert the user (e.g., "In five blocks, your dry cleaning is available for pick-up"). This may be presented to the user even if the user has an event scheduled to pick up the dry cleaning on a different time/day, which, if accomplished, may then cause the cancelling of the scheduled event.

Figure 7A:
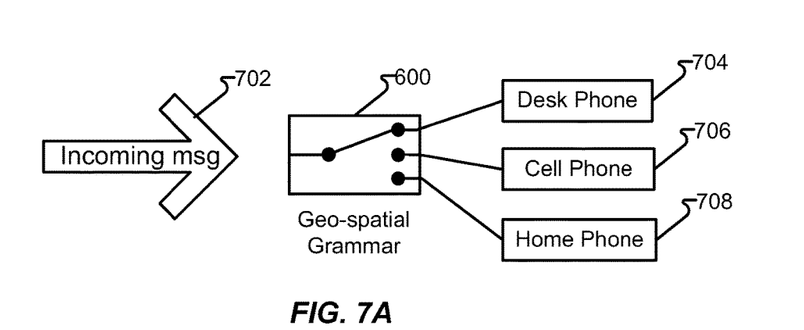
FIG. 7A depicts a geo-spatial datum comprising an incoming message for processing with a geo-spatial grammar, in accordance with embodiments of the disclosure.

FIG. 7A depicts geo-spatial datum 702 comprising an incoming message into geo-spatial grammar 600. Based, at least in part, on geo-spatial grammar 600, one of events 704, 706, 708 is selected, such as to route the message to a particular device associated with a recipient of incoming message of geo-spatial datum 702. Incoming message data of geo-spatial datum 702 may be a message incoming from an external source (e.g., message-generating application, message from a third-party, message from a user of a system utilizing geo-spatial grammar 600, etc.). Geo-spatial grammar 600 determines a location of a user, and an associated device to receive the message. For example, if it is a weekday at 3:00 PM, then the call is routed to the desk of the user, as indicated by output event 704.

Figure 7B:
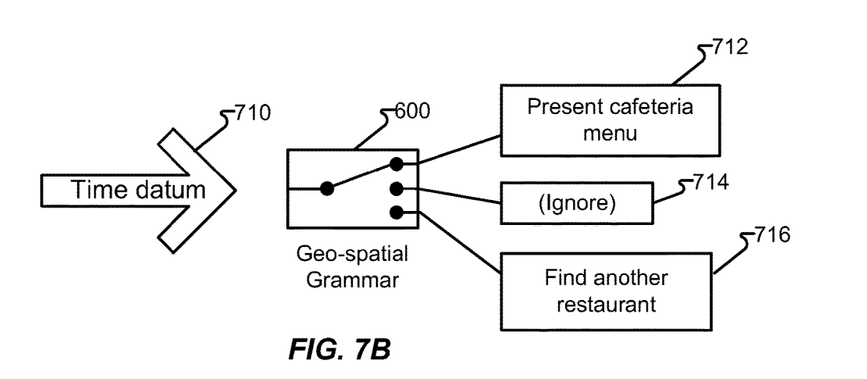
FIG. 7B depicts a geo-spatial datum comprising a time datum for processing with a geo-spatial grammar, in accordance with embodiments of the disclosure.

FIG. 7B depicts geo-spatial datum 710, comprising a time datum, as an input into geo-spatial grammar 600. Based, at least in part, on geo-spatial grammar 600, one of events 712, 714, 716 is selected, such as to trigger an action associated with time datum of geo-spatial datum 710. Time datum of geo-spatial datum 710 may be a one-time event or a recurring event. In one embodiment, geo-spatial grammar 600 determines a location of a user, and an associated action to perform upon time datum of geo-spatial datum 710. For example, time datum of geo-spatial datum 710 may indicate lunchtime (e.g., approximately noon). Geo-spatial grammar 600 then determines if the user is at work, event 712 should be created, such as to present a company cafeteria menu to the user. If geo-spatial grammar 600 determines the day is a weekend or the user is currently located at home, step 714 may override any messages and temporarily ignore the time datum of geo-spatial datum 710 until a different time and/or the user being located at a different location. If geo-spatial grammar 600 determines the user is not at home, not at work, in motion, at a location with an unknown purpose, etc., event 716 may present, or cause a navigation device to present, the locations of nearby or upcoming restaurants. Geo-spatial grammar 600 may further limit the selection to restaurants associated with a user profile or other restaurant-selection criteria.

Figure 7C:
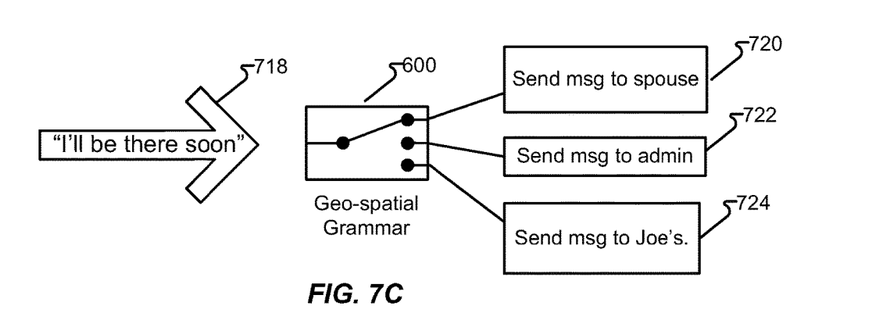
FIG. 7C depicts a geo-spatial datum comprising a user input for processing with a geo-spatial grammar, in accordance with embodiments of the disclosure.

FIG. 7C depicts geo-spatial datum 718, comprising a user input, as an input into geo-spatial grammar 600. Based, at least in part, on geo-spatial grammar 600, one of events 720, 722, 724 is selected, such as to trigger an action associated with time datum 710. User input of geo-spatial datum 718 may be typed, selected, spoken or otherwise indicated via a user input device (e.g., screen, microphone, keypad, sensor, etc.). Geo-spatial grammar 600 may access or incorporate speech-to-text functionality, dictionaries, and/or other language analytic component. For example, the user may speak, "I'll be there soon," during a conversation with a third-party or in response to another event, such as a reminder prompt. Geo-spatial grammar 600 may parse the message and determine a relevant portion, such as "there" and "soon." In response, one or more of events 720, 722, 724 may be selected. For example, if geo-spatial grammar 600 determines the user is on their way home, event 720 may be triggered to notify their spouse of their arrival "soon." If the user is approaching work, such as when they are running late, event 722 may provide a similar notification but to a work-related party (e.g., an admin, co-worker, meeting attendees, etc.). If geo-spatial grammar determines the time is close to "dinner" and the user has, or is suspected of having, a destination in mind (e.g., "Joe's Bistro"), a message may then be created to notify the maitre d' of the restaurant that they will be arriving "soon."

In another embodiment, the term "soon" may be determined by geo-spatial grammar 600 as having a particular meaning in and of itself or in combination with another datum. For example, when "there" means "home" and the user is traveling or at a known location, the phrase, "I'll be there soon," may cause event 720 whereby the user's spouse receives a message stating, "I'll be home in fifteen minutes." In another embodiment, the user's past arrival time, following prior "soon" messages, may be selected as a period of time for a message created by event 720.

Figure 7D:
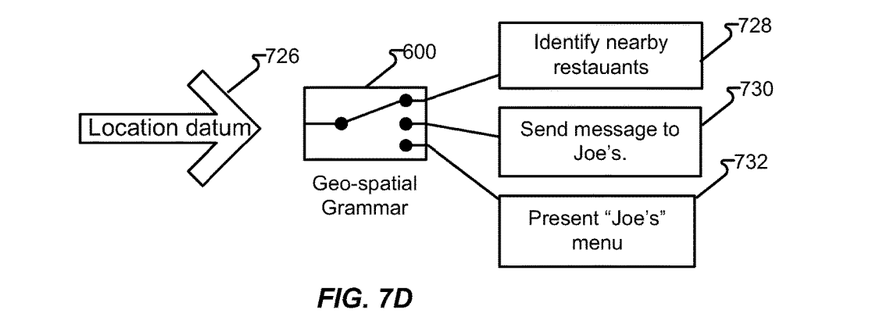
FIG. 7D depicts a geo-spatial datum comprising a location datum for processing with a geo-spatial grammar, in accordance with embodiments of the disclosure.

FIG. 7D depicts geo-spatial datum 726 comprising a location datum as an input into geo-spatial grammar 600. Based, at least in part, on geo-spatial grammar 600, one of events 728, 730, 732 is selected, such as to present a list of suitable destinations (e.g., event 728), send a message to a party based on the location datum (e.g., event 730), present information on the destination determined by geo-spatial grammar 600 (e.g., event 732).

Location datum of geo-spatial datum 726 may have a variety of meanings alone or based upon other datum. For example, driving towards work on a Tuesday may mean, with a very high probability, that the user is going to their place of employment. Whereas driving towards work on a Saturday may mean, with a very low probability, that the user is driving to their place of employment. As the journey progresses, the probably may change in accord with the user deviating from or maintaining their route to work and lead to subsequent location datum inputs of geo-spatial datum 726.

Figure 8:
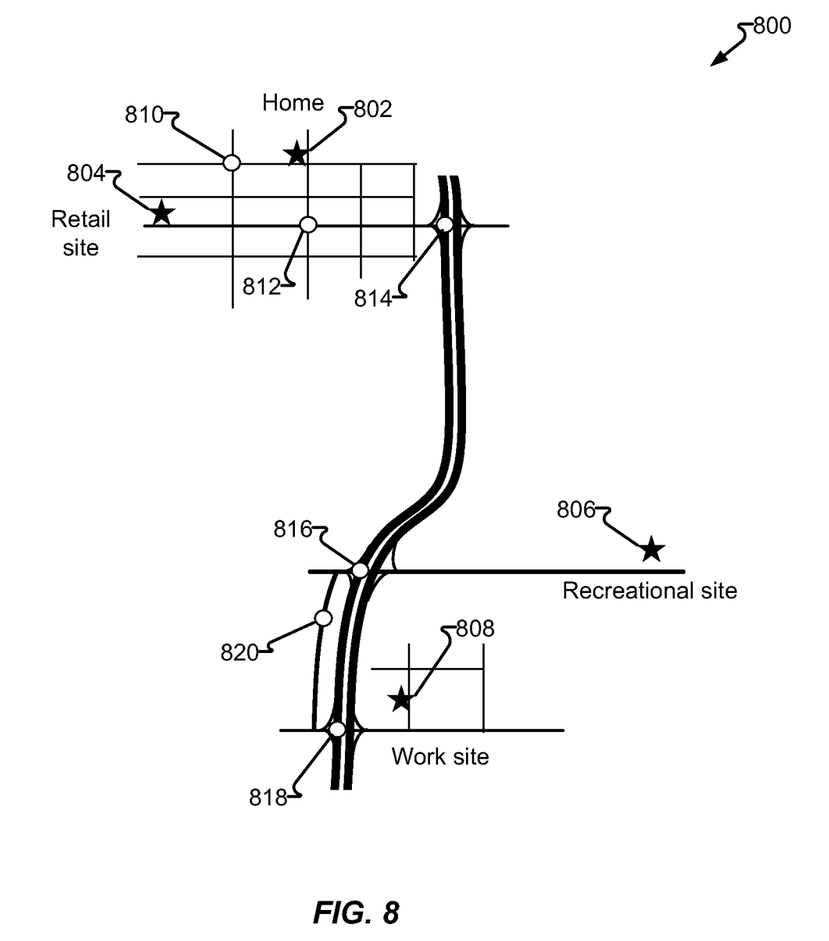
FIG. 8 depicts a geo-spatial grammar selection diagram, in accordance with embodiments of the disclosure.

FIG. 8 depicts geo-spatial grammar selection diagram 800 in accordance with embodiments of the disclosure. In one embodiment, a user lives at location 802. The user, by using a location-aware device, leaves location 802 for an initially unknown destination and a number of geo-spatial grammars are equally valid. As a result, an initial user input (e.g., spoken word or phrase, typed input, etc.) may produce a number of events.

In another embodiment, user travels to node 810, which is known to be an intermediary point to a retail shopping area, node 804. More weight may now be given to a geo-spatial grammar associated with retail shopping near node 804. For example, a user may be presented with a shopping list of items to purchase. In another example, the user's device may create a number of events. One event may be to notify the user's spouse, such as to solicit a list of other items for purchase at the retail site of node 804. Another event, may be to notify the user's work associate that they will be late in arriving at work or, if a meeting request is received, automatically decline or suggest a rescheduled time based upon the user needing to travel from node 804 to the work site at node 808 and, if known, additional time to shop at node 804.

Upon reaching node 812, either directly from home node 802 or retail site 804, the geo-spatial grammar associated with retail site node 804 may be unloaded or de-weighted in favor of other geo-spatial grammars, such as one for recreational site 804 and work site 808. As the user drives and passes through nodes 814, 816, the likelihood that the user is approaching a recreational site at node 806 or a work site at node 808 may increase, such as to further de-weight the geo-spatial grammar associated with retail site node 804 or, if present, a "catch all" geo-spatial grammar associated with driving, living, etc.

In addition to passing through nodes 814, 816, other geo-spatial datum may be used to indicate a geo-spatial grammar associated with a destination. For example, node 816 may be common to trips to recreational site 806 and work site 808 from the user's home at node 802. However, geo-spatial datum, such as time of day, day of week, etc. may indicate a more likely destination and a more likely geo-spatial grammar. Additionally, speed, rate of acceleration/deceleration may be used to determine whether the user is proceeding through node 806 or slowing or turning to head towards recreational site at node 806.

As may be encountered, detours whether forced (e.g., accident, roadwork, etc.) or user-determined (e.g., coffee shop, gas station, unusual errand etc.) may be encountered, such as when user is at node 820. Additional information, such as traffic data or the user's calendar may help to determine whether the geo-spatial data associated with work site 808 is still valid or if the degree of emphasis should be altered. For example, if user is at node 818 there may be a near one hundred percent chance that the destination is work site node 808. However, if the user is at node 820 it may be reduced in proportion to other events, such as when the user has driven a lot of miles and node 820 is the location of a gas station, a work-related geo-spatial grammar may be only slightly de-emphasized, however, if the user has "dentist appointment" on their calendar and node 820 is proximate to a dental office, the work-related grammar may be de-emphasized to a greater degree. If the user then passes through node 818 and turns, decelerates, or performs other actions associated with work site node 808, the work-related grammar may be emphasized, even to the point of exclusion of other geo-spatial grammars.

As a benefit of having a geo-spatial grammar selected in accord with the user's destination, events may be triggered in accord with user inputs. For example, the user may state, "I'll be there soon," and, depending on the geo-spatial grammar, cause an event to be sent to the user's spouse, a work colleague, display traffic information along a route, notify a dental office, or a recreational site. Additionally, or alternatively, communication with associated individuals may be triggered from the event. For example, if the user is decelerating near node 816, an indicator of a turn and a likely destination being recreational node 806, an event may be triggered to notify a friend joining the user at recreational site 806 of an approximate time of arrival. Should the user speak a word or phrase indicating a detour (e.g., "but first I need to get gas," "I'm not able to make it today, I have to . . . ," etc.) an event may be triggered (e.g., reschedule, notifications to other parties, etc.) and, as a further option, a geo-spatial grammar associated with recreational site 806 may be unloaded or de-emphasized.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a data storage;
a processor;
a communication interface that facilitates electronic communication with the processor; and
the processor being programmed to:
receive, via the communication interface, a geo-spatial datum;
select a geo-spatial grammar in accordance with the geo-spatial datum, from the data storage comprising a number of geo-spatial grammars, and wherein each of the number of geo-spatial grammars comprises a rule providing an expected behavior of a user for a time and a location in accordance with a user input, wherein at least one geo-spatial grammar of the number of geo-spatial grammars has a word having a dissimilar meaning from the word of a different geo-spatial grammar of the number of geo-spatial grammars, the meaning of the word being determined by the rule;
receive the user input from the user;
process the user input, that matches the word, in accordance with the rule of the selected geo-spatial grammar to produce an event; and
cause the event to be output.

2. The system of claim 1, wherein the user input is a monitored conversation between the user and another party.

3. The system of claim 1, wherein the processor is further configured to select the geo-spatial grammar in accordance with the geo-spatial datum and an initial user input.

4. The system of claim 1, wherein the processor is further configured to process the user input in accord with the selected geo-spatial grammar to produce the event by parsing the user input comprising a temporal datum; and process the user input to produce the event in accordance with the temporal datum.

5. The system of claim 4, wherein the event comprises a calendar event.

6. The system of claim 5, wherein the event comprises a notification message to a party, other than the user, associated with the calendar event.

7. The system of claim 1, wherein the processor is further configured to process the user input in accordance with the selected geo-spatial grammar to produce the event, by parsing the user input comprising a location; and process the user input to produce the event in accordance with the location.

8. The system of claim 7, wherein the event comprises a future location of the user.

9. The system of claim 8, wherein the event comprises a notification message to a party, other than the user, associated with the future location of the user.

10. The system of claim 1, wherein the geo-spatial datum is at least one of time, day, date, day of the week, day of the month, day of the year, holiday, duration, latitude, longitude, altitude, position relative to a point, direction, speed, rate of change in altitude, ambient temperature, rate of change in temperature, ambient light level, and ambient noise level.

11. The system of claim 1, wherein the user input is a spoken input.

12. A method, comprising:
receiving, via a communication interface, a geo-spatial datum;
selecting a geo-spatial grammar in accordance with the geo-spatial datum, from a data storage comprising a number of geo-spatial grammars, and wherein each of the number of geo-spatial grammars comprises a rule providing an expected behavior of a user for a time and a location in accordance with a user input, wherein at least one geo-spatial grammar of the number of geo-spatial grammars has a word having a dissimilar meaning from the word of a different geo-spatial grammar of the number of geo-spatial grammars, the meaning of the word being determined by the rule;
receiving the user input from the user;
processing, by a microprocessor, the user input, that matches the word, in accordance with the rule of the selected geo-spatial grammar to produce an event; and
output the event.

13. The method of claim 12, further comprising:
monitoring a conversation between the user and another party; and
wherein the user input is the monitored conversation.

14. The method of claim 12, wherein:
the step of processing further comprises, parsing the user input comprising a temporal datum; and producing the event in accord with the temporal datum.

15. The method of claim 14, wherein the event comprises a calendar event.

16. The method of claim 15, wherein the event comprises a notification message to a party, other than the user, associated with the calendar event.

17. The method of claim 12, wherein the step of processing further comprises, parsing the user input comprising a location; and producing the event in accordance with the location.

18. A system comprising:
means to receive, via a communication interface, a geo-spatial datum;
means to select a geo-spatial grammar in accordance with the geo-spatial datum, from a data storage comprising a number of geo-spatial grammars, and wherein each of the number of geo-spatial grammars comprises a rule providing an expected behavior of a user for a time and a location in accordance with a user input, wherein at least one geo-spatial grammar of the number of geo-spatial grammars has a word having a dissimilar meaning from the word of a different geo-spatial grammar of the number of geo-spatial grammars, the meaning of the word being determined by the rule;
means to receive the user input from the user;
means to process, by a microprocessor, the user input, that matches the word, in accordance with the selected geo-spatial grammar to produce an event; and
means to output the event.

19. The system of claim 18, further comprising:
means to parse the user input comprising a temporal datum; and
means to produce the event in accordance with the temporal datum.

20. The system of claim 18, further comprising:
means to parse the user input comprising a location; and
means to produce the event in accordance with the location.

* * * * *